United States Patent
Yang et al.

(10) Patent No.: US 8,412,144 B2
(45) Date of Patent: Apr. 2, 2013

(54) ARCHITECTURE AND METHOD FOR SUPPORTING ZIF OR LIF/IF SYSTEMS

(75) Inventors: Chin-Tai Yang, Hsinchu (TW); Chun-An Tsai, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 13/299,392

(22) Filed: Nov. 18, 2011

(65) Prior Publication Data
US 2012/0326769 A1 Dec. 27, 2012

(30) Foreign Application Priority Data
Jun. 22, 2011 (TW) ............................. 100121882 A (51) Int. Cl.
*H04B 1/16* (2006.01)
(52) U.S. Cl. ........................ 455/334; 455/333; 375/316
(58) Field of Classification Search ................. 455/323, 455/324, 333, 334; 375/316
See application file for complete search history.

(56) References Cited

U.S. PATENT DOCUMENTS

| | | | | |
|---|---|---|---|---|
| 6,028,900 A | * | 2/2000 | Taura et al. | 375/344 |
| 6,522,869 B1 | * | 2/2003 | Hiramatsu et al. | 455/127.2 |
| 7,164,894 B2 | * | 1/2007 | Nagahama et al. | 455/168.1 |
| 7,400,867 B2 | * | 7/2008 | Gamo | 455/137 |
| 8,116,717 B2 | * | 2/2012 | Kuo et al. | 455/313 |

* cited by examiner

*Primary Examiner* — Nhan Le
(74) *Attorney, Agent, or Firm* — Rabin & Berdo, P.C.

(57) ABSTRACT

Architecture for supporting ZIF or LIF/IF systems includes 4N pins, 2N ADCs, a determination unit and a processing unit, N being a positive integer. The 2N ADCs include a y-th ADC for converting a differential analog signal received by a (2y−1)-th pin and a 2y-th pin into a y-th digital signal, y being positive integers ranging from 1 to 2N. The determination unit determines whether the digital signals are ZIF signals, LIF signals or IF signals. The processing unit performs an ZIF system processing on the ZIF signals, performs a LIF system processing on the LIF signals, and performs an IF system processing on the IF signals.

12 Claims, 7 Drawing Sheets

ARCHITECTURE AND METHOD FOR SUPPORTING ZIF OR LIF/IF SYSTEMS

This application claims the benefit of Taiwan application Serial No. 100121882, filed Jun. 22, 2011, the subject matter of which is incorporated herein by reference.

BACKGROUND

1. Technical Field

The invention relates in general to architecture and a method for supporting zero intermediate frequency (ZIF) or low intermediate frequency (LIF)/intermediate frequency (IF) systems.

2. Background

Figure 1:
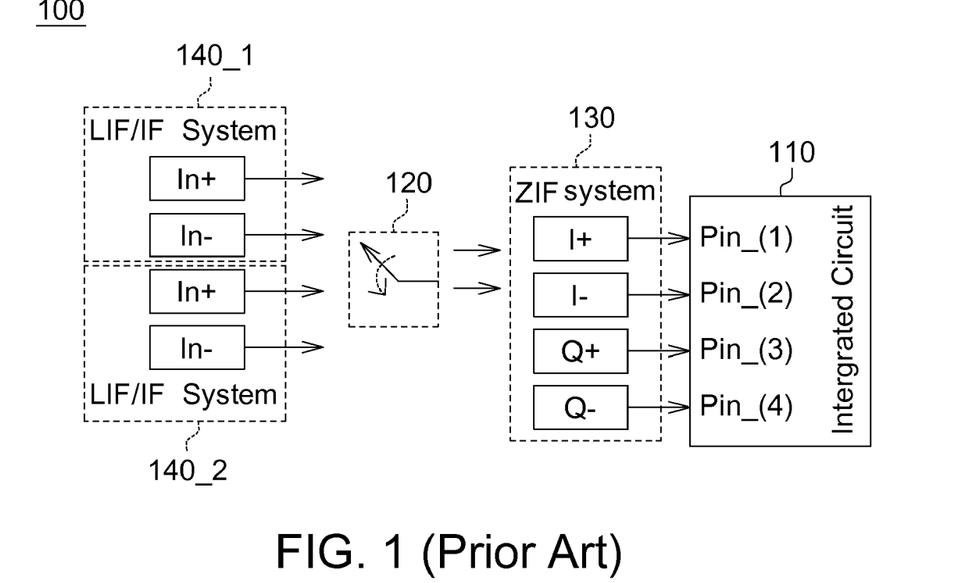
FIG. 1 shows a schematic illustration illustrating traditional architecture for supporting zero intermediate frequency (ZIF) or low intermediate frequency (LIF)/intermediate frequency (IF) systems according to an embodiment.

Referring to FIG. 1, a schematic illustration illustrating traditional architecture for supporting zero intermediate frequency (ZIF) or low intermediate frequency (LIF)/intermediate frequency (IF) systems according to an embodiment is shown. The architecture 100 for supporting ZIF or LIF/IF systems shown in FIG. 1 support a set of ZIF system or two sets of LIF/IF systems at different time. The architecture 100 for supporting ZIF or LIF/IF systems includes an integrated circuit 110 and a switch element 120. On the ZIF system 130, the integrated circuit 110 utilizes 4 pins Pin_(1) to Pin_(4) to respectively receive in-phase signals I+ and I− and quadrature signals Q+ and Q− of the ZIF system 130. On the LIF/IF systems 140_1 and 140_2, the architecture 100 for supporting ZIF or LIF/IF systems utilizes the switch element 120 to switch between the LIF/IF systems 140_1 and 140_2 to input differential input signals In+ and In− of the LIF/IF systems 140_1 or 140_2 into the pins Pin_(1) and Pin_(2) of the integrated circuit 110.

Figure 2:
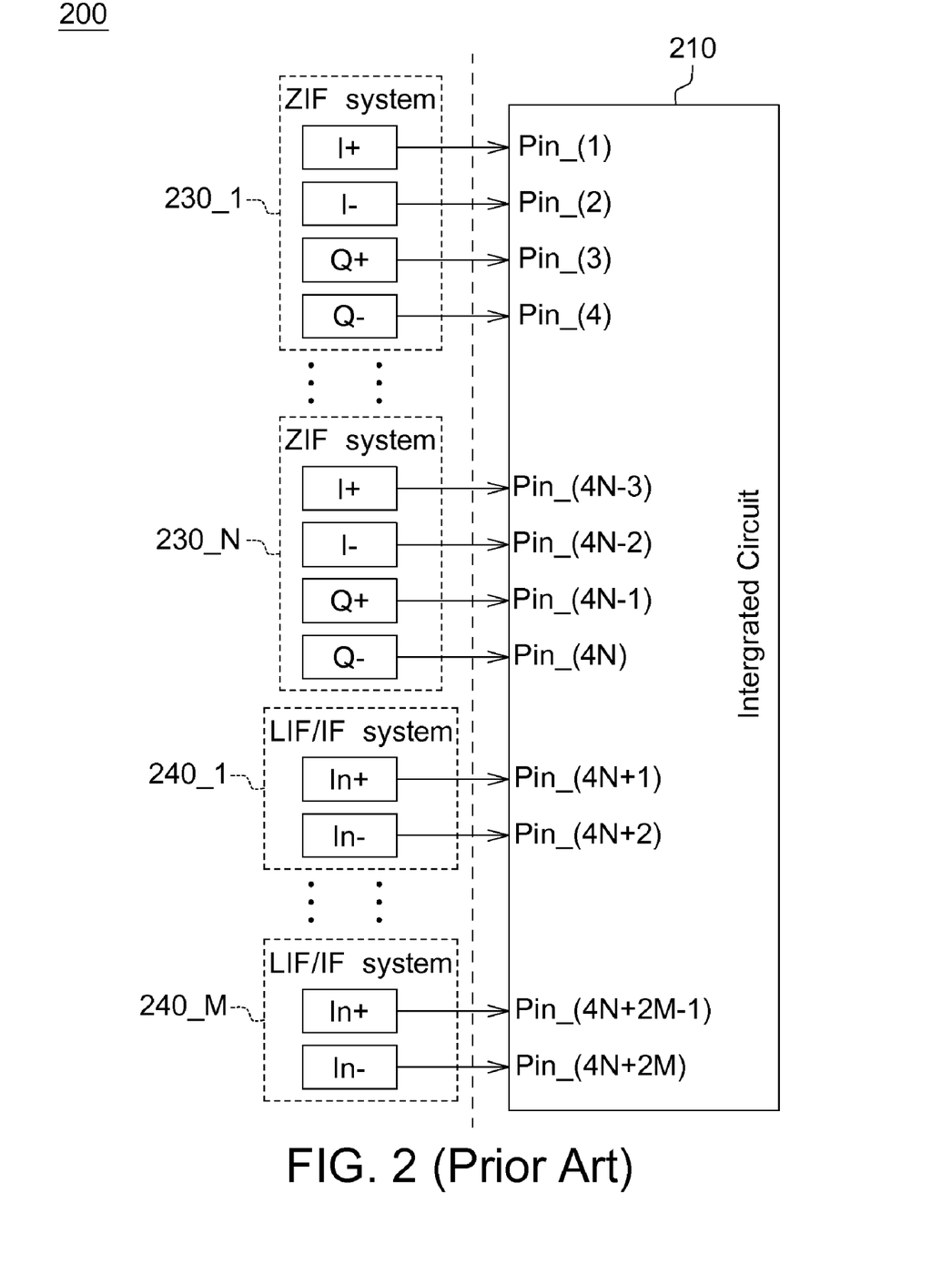
FIG. 2 shows a schematic illustration illustrating traditional architecture for supporting ZIF or LIF/IF systems according to another embodiment.

Referring to FIG. 2, a schematic illustration illustrating traditional architecture for supporting ZIF or LIF/IF systems according to another embodiment is shown. The architecture 200 for supporting ZIF or LIF/IF systems shown in FIG. 2 support N sets of ZIF system or M sets of LIF/IF systems at the same time, N and M being positive integers. On each set of ZIF systems 230_1 to 230_N, an integrated circuit 210 needs 4 pins to receive in-phase signals I+ and I− and quadrature signals Q+ and Q− of each set of ZIF systems 230_1 to 230_N. On each set of LIF/IF systems 240_1 to 240_N, the integrated circuit 210 needs 2 pins to receive differential input signals In+ and In− of each set of LIF/IF systems 240_1 or 240_2. That is, the integrated circuit 210 totally needs (4N+2M) pins for supporting N sets of ZIF systems and M sets of LIF/IF systems at the same time.

To conclude, the traditional architecture 100/200 for supporting ZIF or LIF/IF systems has to increase additional pins or an additional switch element to support applications of the ZIF or the LIF/IF systems, thus causing the still high costs and uneasy applications.

SUMMARY

The disclosure is directed to architecture and a method for supporting zero intermediate frequency (ZIF) or low intermediate frequency (LIF)/intermediate frequency (IF) systems, capable of supporting applications of the ZIF or LIF/IF systems without additional pins or an additional switch element.

According to a first aspect of the present disclosure, architecture for supporting ZIF or LIF/IF systems is provided. The architecture for supporting ZIF or LIF/IF systems includes 4N pins, 2N ADCs, a determination unit and a processing unit, N being a positive integer. The 2N ADCs include a y-th ADC for converting a differential analog signal received by a (2y−1)-th pin and a 2y-th pin into a y-th digital signal, y being positive integers ranging from 1 to 2N. The determination unit determines whether the digital signals are ZIF signals, LIF signals or IF signals. The processing unit performs an ZIF system processing on the ZIF signals, performs a LIF system processing on the LIF signals, and performs an IF system processing on the IF signals.

According to a second aspect of the present disclosure, a method for supporting ZIF or LIF/IF systems applied to architecture for supporting ZIF or LIF/IF systems is provided. The architecture includes 4N pins, 2N ADCs, a determination unit and a processing unit, N being a positive integer. The method includes the following steps. A differential analog signal, received by a (2y−1)-th pin and a 2y-th pin of the pins, is converted into a y-th digital signal by a y-th ADC of the 2N ADCs, y being positive integers ranging from 1 to 2N. Whether the digital signals are ZIF signals, LIF signals or IF signals is determined by the determination unit. A ZIF system processing is performed on the ZIF signals, a LIF system processing is performed on the LIF signals, and an IF system processing is performed on the IF signals by the processing unit.

The invention will become apparent from the following detailed description of the preferred but non-limiting embodiments. The following description is made with reference to the accompanying drawings.

DETAILED DESCRIPTION OF THE INVENTION

The disclosure proposes architecture and a method for supporting zero intermediate frequency (ZIF) or low intermediate frequency (LIF)/intermediate frequency (IF) systems, capable of supporting applications of the ZIF or LIF/IF systems without additional pins or an additional switch element.

The architecture for supporting ZIF or LIF/IF systems proposed in the disclosure includes 4N pins, 2N Analog to Digital Converters (ADCs), a determination unit and a processing unit, N being a positive integer. The 2N ADCs include a y-th ADC for converting a differential analog signal received by a (2y−1)-th pin and a 2y-th pin into a y-th digital signal, y being positive integers ranging from 1 to 2N. The determination unit determines whether the digital signals are ZIF signals, LIF signals or IF signals. The processing unit performs an ZIF system processing on the ZIF signals, performs a LIF system processing on the LIF signals, and performs an IF system processing on the IF signals.

Figure 3:
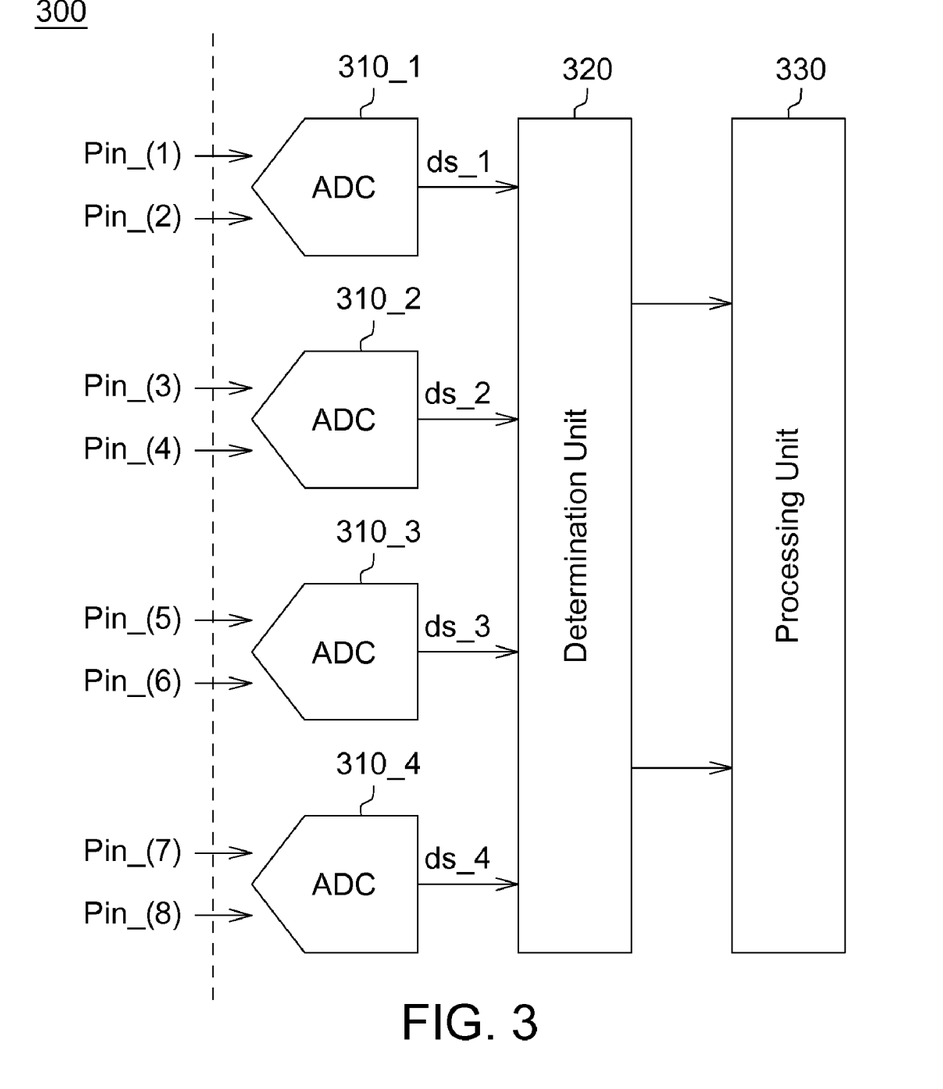
FIG. 3 shows a schematic illustration illustrating architecture for supporting ZIF or LIF/IF systems according to an embodiment.
Figure 4A:
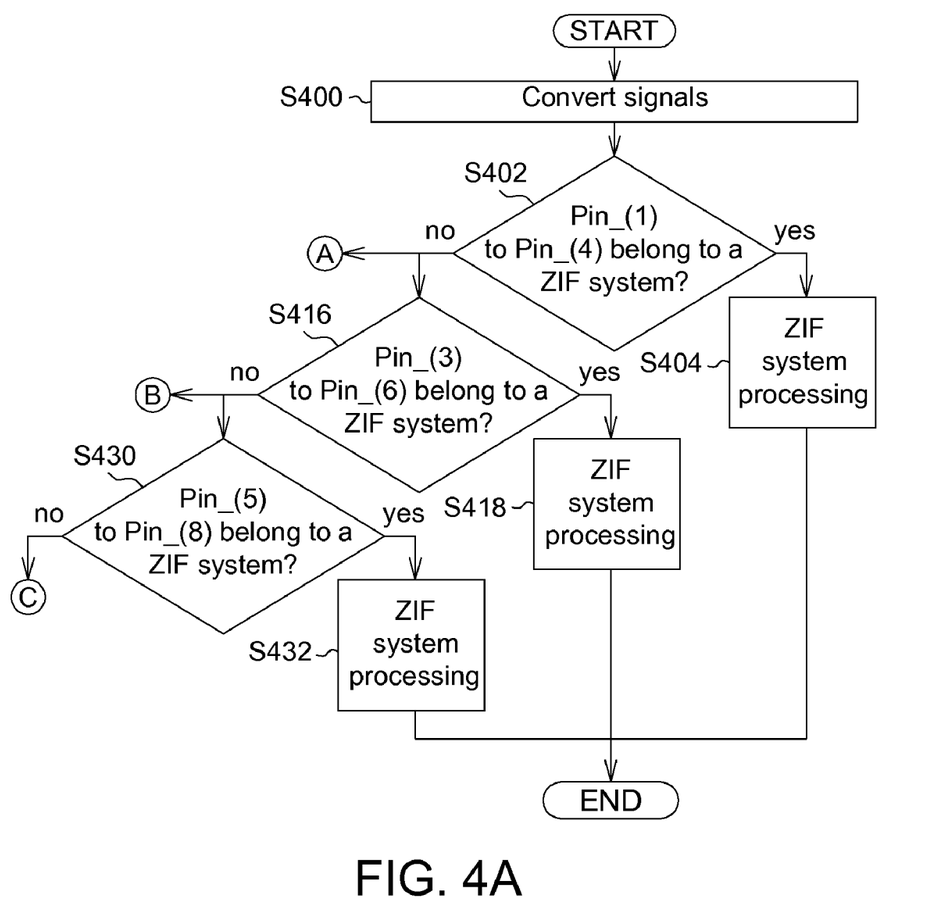
FIG. 4A to FIG. 4D show flow charts illustrating a method for supporting ZIF or LIF/IF systems corresponding to FIG. 3.
Figure 4B:
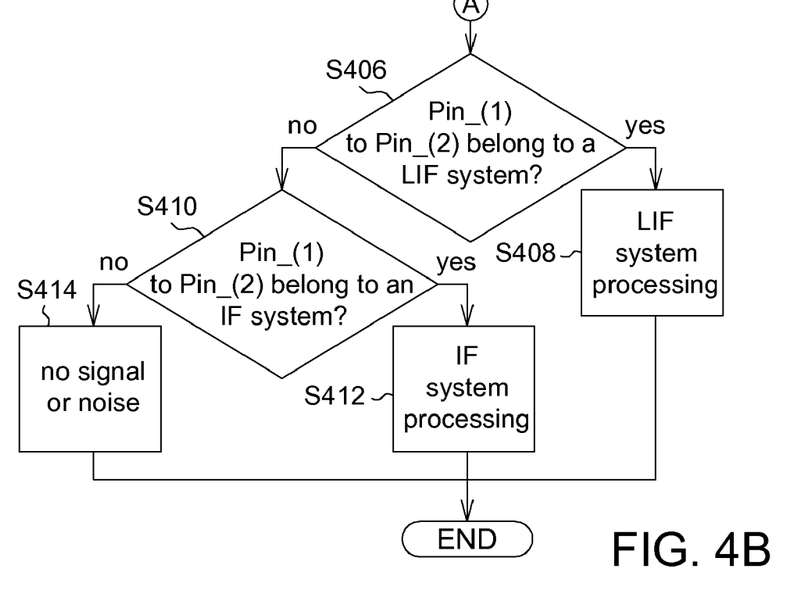
Figure 4C:
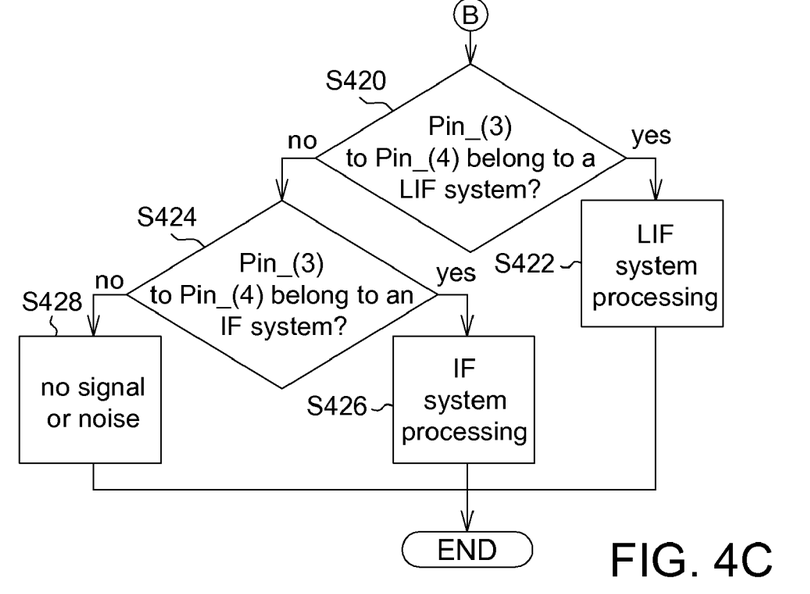
Figure 4D:
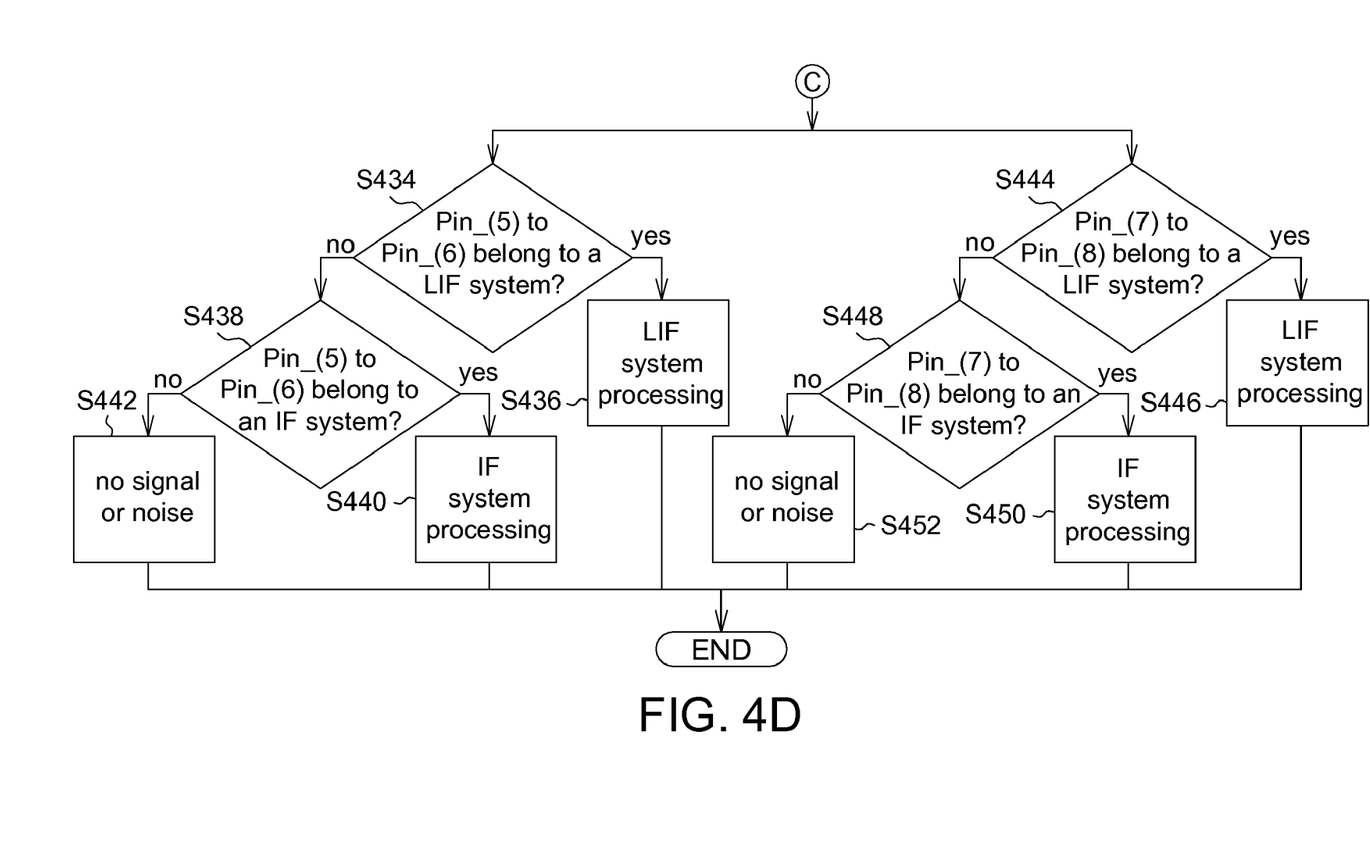

Take N equal to 2 as being exemplified below, but it is not limited thereto. Referring to FIG. 3, a schematic illustration illustrating architecture for supporting ZIF or LIF/IF systems according to an embodiment is shown. The architecture 300 for supporting ZIF or LIF/IF systems includes 8 pins Pin_(1) to Pin_(8), 4 ADCs 310_1 to 310_4, a determination unit 320 and a processing unit 330. The 8 pins Pin_(1) to Pin_(8), the 4 ADCs 310_1 to 310_4, the determination unit 320 and the processing unit 330 may be substantially implemented by an integrated circuit (IC).

Referring to FIG. 4A to FIG. 4D, flow charts illustrating a method for supporting ZIF or LIF/IF systems corresponding to FIG. 3 are shown. In step S400, ADCs convert the differential analog signals received by the pins into digital signals. For example, the ADC 310_1 converts the differential analog signals received by the pins Pin_(1) and Pin_(2) into the digital signal ds_1; the ADC 310_2 converts the differential analog signals received by the pins Pin_(3) and Pin_(4) into the digital signal ds_2; the ADC 310_3 converts the differential analog signals received by the pins Pin_(5) and Pin_(6) into the digital signal ds_3; the ADC 310_4 converts the differential analog signals received by the pins Pin_(7) and Pin_(8) into the digital signal ds_4.

Next, the determination unit 320 determines whether the digital signals outputted by the ADCs are ZIF signals in sequence. In step S402, the determination unit 320 determines whether the digital signals ds_1 and ds_2 are ZIF signals; that is, the determination unit 320 determines whether inputs of the pins Pin_(1) to Pin_(4) belong to the ZIF system. If the inputs of the pins Pin_(1) to Pin_(4) belong to the ZIF system, then in step S404, the processing unit 330 performs a ZIF system processing on the digital signals ds_1 and ds_2. If the inputs of the pins Pin_(1) to Pin_(4) do not belong to the ZIF system, then in step S406, the determination unit 320 determines whether the digital signal ds_1 is a LIF signal; that is, the determination unit 320 determines the inputs of the pins Pin_(1) and Pin_(2) belong to the LIF system.

If the inputs of the pins Pin_(1) to Pin_(2) belong to the LIF system, then in step S408, the processing unit 330 performs a LIF system processing on the digital signal ds_1. If the inputs of the pins Pin_(1) to Pin_(2) do not belong to the ZIF system, then in step S410, the determination unit 320 determines whether the digital signal ds_1 is an IF signal; that is, the determination unit 320 determines the inputs of the pins Pin_(1) and Pin_(2) belong to the IF system. If the inputs of the pins Pin_(1) to Pin_(2) belong to the IF system, then in step S412, the processing unit 330 performs an IF system processing on the digital signal ds_1. If the inputs of the pins Pin_(1) to Pin_(2) do not belong to the IF system, then in step S414, the processing unit 330 regards as no signal or regards the digital signal ds_1 as noise.

In step S416, the determination unit 320 determines whether the digital signals ds_2 and ds_3 are ZIF signals; that is, the determination unit 320 determines whether inputs of the pins Pin_(3) to Pin_(6) belong to the ZIF system. If the inputs of the pins Pin_(3) to Pin_(6) belong to the ZIF system, then in step S418, the processing unit 330 performs a ZIF system processing on the digital signals ds_2 and ds_3. If the inputs of the pins Pin_(3) to Pin_(6) do not belong to the ZIF system, then in step S420, the determination unit 320 determines whether the digital signal ds_2 is a LIF signal; that is, the determination unit 320 determines the inputs of the pins Pin_(3) and Pin_(4) belong to the LIF system.

If the inputs of the pins Pin_(3) to Pin_(4) belong to the LIF system, then in step S422, the processing unit 330 performs a LIF system processing on the digital signal ds_2. If the inputs of the pins Pin_(3) to Pin_(4) do not belong to the ZIF system, then in step S424, the determination unit 320 determines whether the digital signal ds_2 is an IF signal; that is, the determination unit 320 determines the inputs of the pins Pin_(3) and Pin_(4) belong to the IF system. If the inputs of the pins Pin_(3) to Pin_(4) belong to the IF system, then in step S426, the processing unit 330 performs an IF system processing on the digital signal ds_2. If the inputs of the pins Pin_(3) to Pin_(4) do not belong to the IF system, then in step S428, the processing unit 330 regards as no signal or regards the digital signal ds_2 as noise.

In step S430, the determination unit 320 determines whether the digital signals ds_3 and ds_4 are ZIF signals; that is, the determination unit 320 determines whether inputs of the pins Pin_(5) to Pin_(8) belong to the ZIF system. If the inputs of the pins Pin_(5) to Pin_(8) belong to the ZIF system, then in step S432, the processing unit 330 performs a ZIF system processing on the digital signals ds_3 and ds_4. If the inputs of the pins Pin_(5) to Pin_(8) do not belong to the ZIF system, then in step S434, the determination unit 320 determines whether the digital signal ds_3 is a LIF signal; that is, the determination unit 320 determines the inputs of the pins Pin_(5) and Pin_(6) belong to the LIF system.

If the inputs of the pins Pin_(5) to Pin_(6) belong to the LIF system, then in step S436, the processing unit 330 performs a LIF system processing on the digital signal ds_3. If the inputs of the pins Pin_(5) to Pin_(6) do not belong to the ZIF system, then in step S438, the determination unit 320 determines whether the digital signal ds_3 is an IF signal; that is, the determination unit 320 determines the inputs of the pins Pin_(5) and Pin_(6) belong to the IF system. If the inputs of the pins Pin_(5) to Pin_(6) belong to the IF system, then in step S440, the processing unit 330 performs an IF system processing on the digital signal ds_3. If the inputs of the pins Pin_(5) to Pin_(6) do not belong to the IF system, then in step S442, the processing unit 330 regards as no signal or regards the digital signal ds_3 as noise.

In addition, In step S444, the determination unit 320 determines whether the digital signal ds_4 is a LIF signal; that is, the determination unit 320 determines the inputs of the pins Pin_(7) and Pin_(8) belong to the LIF system. If the inputs of the pins Pin_(7) to Pin_(8) belong to the LIF system, then in step S446, the processing unit 330 performs a LIF system processing on the digital signal ds_4. If the inputs of the pins Pin_(7) to Pin_(8) do not belong to the ZIF system, then in step S448, the determination unit 320 determines whether the digital signal ds_4 is an IF signal; that is, the determination unit 320 determines the inputs of the pins Pin_(7) and Pin_(8) belong to the IF system. If the inputs of the pins Pin_(7) to Pin_(8) belong to the IF system, then in step S450, the processing unit 330 performs an IF system processing on the digital signal ds_4. If the inputs of the pins Pin_(7) to Pin_(8) do not belong to the IF system, then in step S452, the processing unit 330 regards as no signal or regards the digital signal ds_4 as noise.

Figure 5:
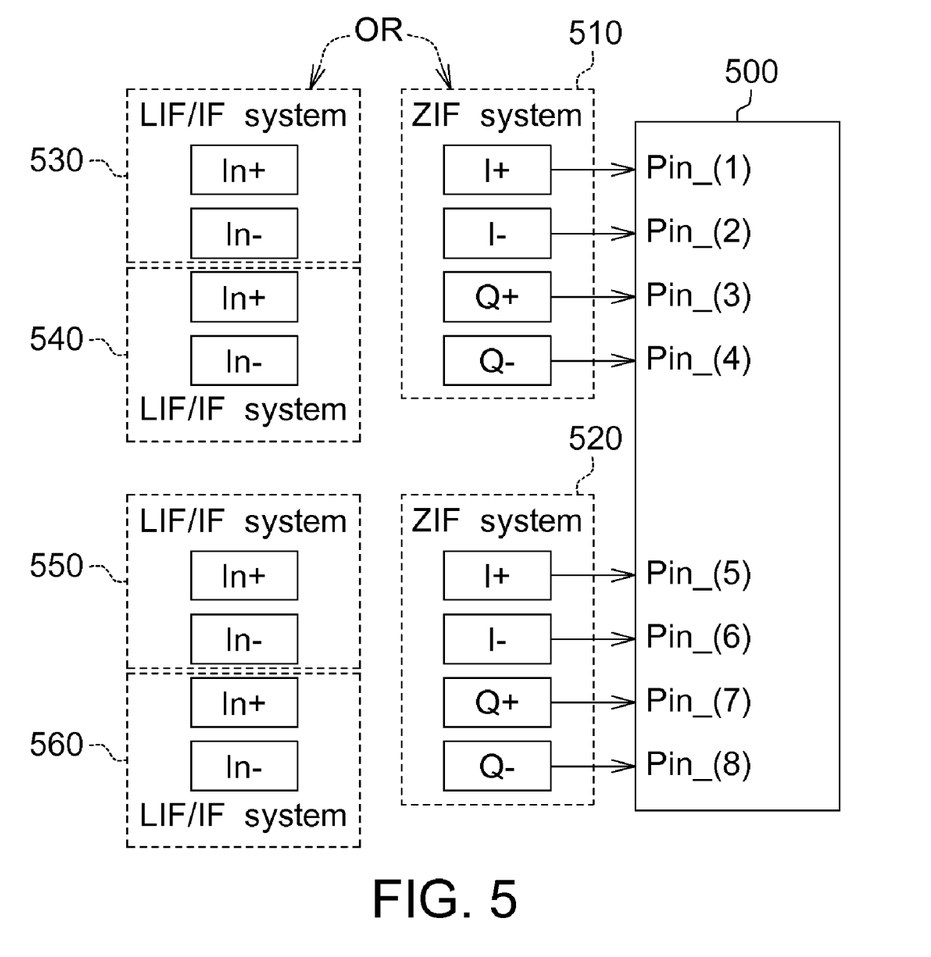
FIG. 5 shows a schematic illustration illustrating architecture for supporting ZIF or LIF/IF systems according to another embodiment.

Referring to FIG. 5, a schematic illustration illustrating architecture for supporting ZIF or LIF/IF systems according to another embodiment is shown. The architecture 500 for supporting ZIF or LIF/IF systems in FIG. 5 applies the technical features of the present disclosure and can support not only 2 sets of ZIF systems 510 and 520 or 4 sets of LIF/IF systems 530, 540, 550 and 560 at different time, but also 1 set of ZIF system, one of 510 and 520, and 2 sets of LIF/IF systems, two of 530, 540, 550 and 560, at the same time, without additional pins or additional switch elements.

In addition, the disclosure proposes a method for supporting ZIF or LIF/IF systems applied to architecture for supporting ZIF or LIF/IF systems. The architecture includes 4N pins, 2N ADCs, a determination unit and a processing unit, N being a positive integer. The method includes the following steps. A differential analog signal, received by a (2y−1)-th pin and a 2y-th pin of the pins, is converted into a y-th digital signal by a y-th ADC of the 2N ADCs, y being positive integers ranging from 1 to 2N. Whether the digital signals are ZIF signals, LIF signals or IF signals is determined by the determination unit. A ZIF system processing is performed on the ZIF signals, a LIF system processing is performed on the LIF signals, and an IF system processing is performed on the IF signals by the processing unit.

The detailed principles of the above method for supporting ZIF or LIF/IF systems have been described in related contents of FIG. 3 to FIG. 5, so detailed description thereof will be omitted.

The architecture and method for supporting ZIF or LIF/IF systems proposed in the disclosure can support applications of the ZIF or LIF/IF systems without additional pins or an additional switch element. The proposed architecture and method not only keeps or lowers the costs but also make the whole system be more suitable for various applications.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. Architecture for supporting zero intermediate frequency (ZIF) or low intermediate frequency (LIF)/intermediate frequency (IF) systems, comprising:
    4N pins, N being a positive integer;
    2N analog to digital converters (ADCs), comprising a y-th ADC for converting a differential analog signal, received by a (2y−1)-th pin and a 2y-th pin of the pins, into a y-th digital signal, y being positive integers ranging from 1 to 2N;
    a determination unit for determining whether the digital signals are ZIF signals, LIF signals or IF signals; and
    a processing unit for performing an ZIF system processing on the ZIF signals, performing a LIF system processing on the LIF signals, and performing an IF system processing on the IF signals.

2. The Architecture for supporting ZIF or LIF/IF systems according to claim 1, wherein the determination unit determines whether a (2x−1)-th digital signal and a 2x-th digital signal of the digital signals are ZIF signals, x being positive integers ranging from 1 to 2N in sequence.

3. The Architecture for supporting ZIF or LIF/IF systems according to claim 2, wherein when the (2x−1)-th digital signal and the 2x-th digital signal are not ZIF signals, the determination unit determines whether the (2x−1)-th digital signal is a LIF signal, and then when the (2x−1)-th digital signal is not the LIF signal, the determination unit determines whether the (2x−1)-th digital signal is an IF signal.

4. The Architecture for supporting ZIF or LIF/IF systems according to claim 3, wherein when the (2x−1)-th digital signal is not the IF signal, the determination unit regards as no signal or regards the (2x−1)-th digital signal as noise.

5. The Architecture for supporting ZIF or LIF/IF systems according to claim 2, wherein the (2x−1)-th digital signal and the 2x-th digital signal are not ZIF signals, the determination unit determines whether the 2x-th digital signal is a LIF signal, and then when the 2x-th digital signal is not the LIF signal, the determination unit determines whether the 2x-th digital signal is an IF signal.

6. The Architecture for supporting ZIF or LIF/IF systems according to claim 5, wherein when the 2x-th digital signal is not the IF signal, the determination unit regards as no signal or regards the 2x-th digital signal as noise.

7. A method for supporting ZIF or LIF/IF systems, applied to architecture for supporting ZIF or LIF/IF systems, which comprises 4N pins, 2N ADCs, a determination unit and a processing unit, N being a positive integer, the method comprising:
    converting a differential analog signal, received by a (2y−1)-th pin and a 2y-th pin of the pins, into a y-th digital signal by a y-th ADC of the 2N ADCs, y being positive integers ranging from 1 to 2N;
    determining whether the digital signals are ZIF signals, LIF signals or IF signals by the determination unit; and
    performing an ZIF system processing on the ZIF signals, performing a LIF system processing on the LIF signals, and performing an IF system processing on the IF signals by the processing unit.

8. The method for supporting ZIF or LIF/IF systems according to claim 7, further comprising:
    determining whether a (2x−1)-th digital signal and a 2x-th digital signal of the digital signals are ZIF signals by the determination unit, x being positive integers ranging from 1 to 2N in sequence.

9. The method for supporting ZIF or LIF/IF systems according to claim 8, further comprising:
    determining whether the (2x−1)-th digital signal is a LIF signal by the determination unit when the (2x−1)-th digital signal and the 2x-th digital signal are not ZIF signals; and
    determining whether the (2x−1)-th digital signal is an IF signal by the determination unit when the (2x−1)-th digital signal is not the LIF signal.

10. The method for supporting ZIF or LIF/IF systems according to claim 9, further comprising:
    regarding as no signal or regarding the (2x−1)-th digital signal as noise by the determination unit when the (2x−1)-th digital signal is not the IF signal.

11. The method for supporting ZIF or LIF/IF systems according to claim 8, further comprising:
    determining whether the 2x-th digital signal is a LIF signal by the determination unit when the (2x−1)-th digital signal and the 2x-th digital signal are not ZIF signals; and
    determining whether the 2x-th digital signal is an IF signal by the determination unit when the 2x-th digital signal is not the LIF signal.

12. The method for supporting ZIF or LIF/IF systems according to claim 11, further comprising:
    regarding as no signal or regarding the 2x-th digital signal as noise by the determination unit when the 2x-th digital signal is not the IF signal.

* * * * *